(12) United States Patent
El Hajj et al.

(10) Patent No.: US 12,113,563 B2
(45) Date of Patent: Oct. 8, 2024

(54) METHODS AND DEVICES FOR POWER MANAGEMENT TECHNIQUES WITH TIME AVERAGED SAR AND PROXIMITY SENSOR CONSIDERATIONS

(71) Applicant: Intel Corporation, Santa Clara, CA (US)

(72) Inventors: Walid El Hajj, Antibes (FR); Mythili Hegde, Karnataka (IN); Nawfal Asrih, Mandelieu-la-Napoule (FR); Manuel Blazquez De Pineda, Antibes (FR); John Michael Roman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 17/701,729

(22) Filed: Mar. 23, 2022

(65) Prior Publication Data

US 2022/0345168 A1 Oct. 27, 2022

(30) Foreign Application Priority Data

Apr. 23, 2021 (IN) .............................. 202141018904

(51) Int. Cl.
*H04B 1/3827* (2015.01)
*H04W 52/36* (2009.01)

(52) U.S. Cl.
CPC ........ *H04B 1/3838* (2013.01); *H04W 52/367* (2013.01)

(58) Field of Classification Search
CPC .................................................... H04B 1/3838
See application file for complete search history.

(56) References Cited

U.S. PATENT DOCUMENTS

| | | | | |
|---|---|---|---|---|
| 5,524,275 A | * | 6/1996 | Lindell | H04B 1/3838 455/127.1 |
| 7,146,139 B2 | * | 12/2006 | Nevermann | H04B 1/3838 343/702 |
| 9,491,706 B2 | * | 11/2016 | Thorson | H04W 52/367 |
| 9,867,139 B1 | * | 1/2018 | Khasgiwala | H04B 17/318 |

* cited by examiner

*Primary Examiner* — Hsinchun Liao
(74) *Attorney, Agent, or Firm* — Viering, Jentschura & Partner mbB; Benjamin L. Von Rueden

(57) ABSTRACT

Methods and device to implement the use of proximity sensor data and time-averaging specific absorption rate methods in determining whether to apply or remove a power back-off to a radio frequency transmitter. The methods and devices may be configured to detect whether a body is proximately located based on obtained proximity sensor data; define an upper threshold for a radio frequency (RF) transmit power and a lower threshold for the RF transmit power; calculate an average power of an RF transmitter over a fixed time period; and based on whether the body is detected, the average power, and a comparison of the average power to the upper threshold or the lower threshold, determine whether to apply or remove a power back-off to the RF transmitter.

21 Claims, 4 Drawing Sheets

METHODS AND DEVICES FOR POWER MANAGEMENT TECHNIQUES WITH TIME AVERAGED SAR AND PROXIMITY SENSOR CONSIDERATIONS

CROSS-REFERENCE TO RELATED APPLICATIONS

This application claims priority to Indian Patent Application IN 202141018904, filed on Apr. 23, 2021, the entirety of which is incorporated herein by reference.

TECHNICAL FIELD

Various aspects relate generally to wireless communications techniques including radiation exposure control.

BACKGROUND

Many emerging communication technologies, such as 5G New Radio (NR), use higher radio frequency (RF) waves and higher energies in to improve throughput, among other advantages. While these techniques provide faster and more robust communications, they may also increase RF radiation in the environment, including to users, and may be subject to higher attenuation due to the characteristics of higher frequency waves. The amount of radiation energy emitted absorbed by a unit of mass of a user over time is termed the specific absorption rate (SAR).

Various regulators, including the Federal Communications Commission (FCC) and the International Commission on Non-Ionizing Radiation Protection (ICNIRP), have introduced stringent requirements that limit the amount of radiation that a device can deliver to users. Accordingly, methods and devices for implementing mechanisms to reduce radiation exposure to users while also maintaining high levels of link quality to improve user experience are desired.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
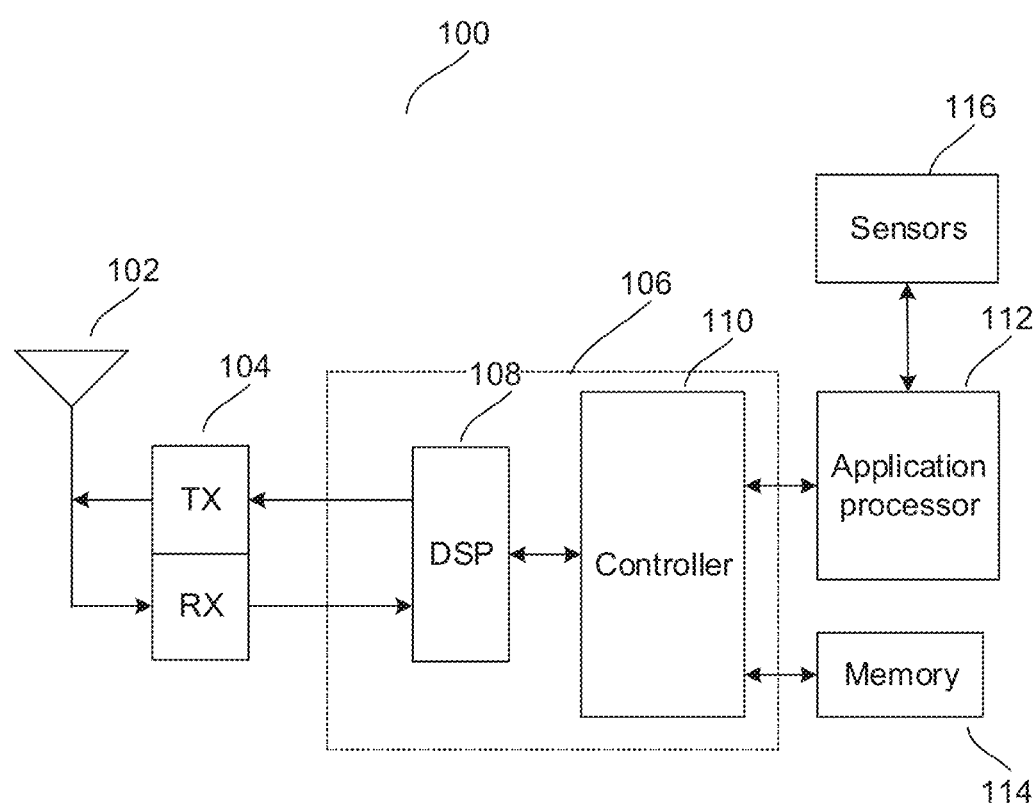
FIG. 1 exemplarily shows an internal configuration of terminal device according to some aspects.

SAR or human exposure compliance may be managed by detecting when RF exposure exceeds the specified limits, where SAR is reduced by static power reduction through the use of look-up tables. Devices may use proximity sensors to detect the physical proximity of users to the antenna and the RF transmit power may be reduced accordingly.

However, the implementation of proximity sensors in standalone may not be optimal because static power reduction is relative to continuous operation at maximum output power; i.e., 100% of the time. This may be quite unrealistic and may impact data throughput performance and network capacity efficiency. Consequently, the approach of applying time-averaging in real-time to ensure RF exposure compliance may be considered to provide more practical and realistic SAR or Power Density.

Different algorithms and averaging methods may be used for time averaged SAR or Power Density. However, activating a Time Averaging SAR (TAS) algorithm all the time without the presence of a human body may not be necessary or useful and may degrade device performance.

Using the proximity sensor together with a TAS algorithm provides a solution to this issue. The present disclosure presents a management strategy and methodology that provides for the combination of proximity sensor features and TAS features in RF transmitter power management techniques.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), next Generation NodeBs (gNBs), Home base stations, Remote Radio Heads (RRHs), relay points, Wireless Local Area Network (WLAN) Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes).

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" may encompass one or both of transmitting and receiving, i.e., unidirectional or bidirectional communication in one or both of the incoming and outgoing directions. The term "calculate" may encompass both 'direct' calculations via a mathematical expression/formula/relationship and 'indirect' calculations via lookup or hash tables and other array indexing or searching operations.

FIG. 1 shows an internal configuration of terminal device 100 for operating in wireless radio communications according to some aspects. Terminal device 100 may include antenna system 102, radio frequency (RF) transceiver 104, baseband modem 106 (including digital signal processor 108 and protocol controller 110), application processor 112, memory 114, and sensors 116. Baseband modem 106 may also be referred to as "baseband processor," "cellular modem," or the like.

Although not explicitly shown in FIG. 1, in some aspects terminal device 100 may include one or more additional hardware and/or software components, such as processors/microprocessors, controllers/microcontrollers, other specialty or generic hardware/processors/circuits, peripheral device(s), sensor(s), memory, power supply, external device interface(s), subscriber identity module(s) (SIMs), user input/output devices (display(s), keypad(s), touchscreen(s), speaker(s), external button(s), camera(s), microphone(s), etc.), or other components.

Terminal device 100 may transmit and receive radio signals on one or more radio access networks. Baseband modem 106 may direct such communication functionality of terminal device 100 according to the communication protocols associated with each radio access network and may execute control over antenna system 102 and RF transceiver 104 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 100 shown in FIG. 1 depicts only a single instance of such components.

Terminal device 100 may transmit and receive wireless signals with antenna system 102, which may be a single antenna or an antenna array that includes multiple antennas. In some aspects, antenna system 102 may additionally include antenna combination and/or beamforming circuitry. In the receive (RX) path, RF transceiver 104 may receive analog radio frequency signals from antenna system 102 and perform analog and digital RF front-end processing on the analog radio frequency signals to produce digital baseband samples (e.g., In-Phase/Quadrature (IQ) samples) to provide to baseband modem 106. RF transceiver 104 may include analog and digital reception components including amplifiers (e.g., Low Noise Amplifiers (LNAs)), filters, RF demodulators (e.g., RF IQ demodulators)), and analog-to-digital converters (ADCs), which RF transceiver 104 may utilize to convert the received radio frequency signals to digital baseband samples. In the transmit (TX) path, RF transceiver 104 may receive digital baseband samples from baseband modem 106 and perform analog and digital RF front-end processing on the digital baseband samples to produce analog radio frequency signals to provide to antenna system 102 for wireless transmission. RF transceiver 104 may thus include analog and digital transmission components including amplifiers (e.g., Power Amplifiers (PAs), filters, RF modulators (e.g., RF IQ modulators), and digital-to-analog converters (DACs), which RF transceiver 104 may utilize to mix the digital baseband samples received from baseband modem 106 and produce the analog radio frequency signals for wireless transmission by antenna system 102. In some aspects, baseband modem 106 may control the radio transmission and reception of RF transceiver 104, including specifying the transmit and receive radio frequencies and/or power for operation of RF transceiver 104.

As shown in FIG. 1, baseband modem 106 may include digital signal processor 108, which may perform physical layer (PHY, Layer 1) transmission and reception processing to, in the transmit path, prepare outgoing transmit data provided by protocol controller 110 for transmission via RF transceiver 104, and, in the receive path, prepare incoming received data provided by RF transceiver 104 for processing by protocol controller 110. Digital signal processor 108 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 108 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 108 may include one or more processors configured to retrieve and execute program code that defines control and processing logic for physical layer processing operations. In some aspects, digital signal processor 108 may execute processing functions with software via the execution of executable instructions. In some aspects, digital signal processor 108 may include one or more dedicated hardware circuits (e.g., ASICs, FPGAs, and other hardware) that are digitally configured to specific execute processing functions, where the one or more processors of digital signal processor 108 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 108 may be realized as a coupled integrated circuit.

Terminal device 100 may also include application processor 112 and memory 114. Application processor 112 may be a CPU and may be configured to handle the layers above the protocol stack, including the transport and application layers. Application processor 112 may be configured to execute various applications and/or programs of terminal device 100 at an application layer of terminal device 100, such as an operating system (OS), a user interface (UI) for supporting user interaction with terminal device 100, and/or various user applications. The application processor may interface with baseband modem 106 and act as a source (in the transmit path) and a sink (in the receive path) for user data, such as voice data, audio/video/image data, messaging data, application data, basic Internet/web access data, etc.

Memory 114 may embody a memory component of terminal device 100, such as a hard drive or another such permanent memory device. Although not explicitly depicted in FIG. 1, the various other components of terminal device 100 shown in FIG. 1 may additionally each include integrated permanent and non-permanent memory components, such as for storing software program code, buffering data, etc.

Sensors 116 may be operably coupled to the application processors 112 and may include proximity sensors that acquire data about the terminal device 100 and/or its environment. These sensors may include components such as camera(s), LIDAR sensor(s), radar sensor(s), other proximity sensor(s), inertial measurement unit (IMU) sensor(s), or the like.

In some aspects, the present disclosure presents a TAS algorithm combined with proximity sensor operation allowing for power management control in the presence or absence of a human body. The present disclosure provides numerous advantages, including, but not limited to: improving performance and network capacity efficiency and providing the flexibility to equipment manufacturers to either choose a proximity sensor (P-Sensor) SAR based solution, a TAS solution, or a combination of both based on their hardware platform's design.

In some aspects, the methods and algorithms described herein use a sliding time window averaging to calculate the average power (Avg_Pow) of a device during a given averaging time (Ta) defined by regulatory requirements. For example, for FCC compliance, the Ta=100 seconds is for frequencies below 3 GHz. The Avg_Pow is calculated each Tr period defining the resolution or the granularity. Two threshold levels of power are utilized by the algorithm and are denoted as the upper and lower thresholds. In the present disclosure, the upper threshold may be abbreviated as UppThresh, Upp_Thresh, Upp_Th, or the like. The lower threshold may be abbreviated as LowThresh, Low_Thresh, LowTh, or the like. In some aspects, the upper threshold may be selected based on SAR regulatory considerations, e.g., a maximum RF transmitter power while maintaining SAR regulatory compliance. The lower threshold may be selected to be below the upper threshold and be based on conditions that the device is operating in, for example. In some aspects, the lower threshold may be selected to be, for example, 1-3 dBs below the upper threshold.

The maximum power level in Dynamic Power Reduction (DPR) state is defined as "DPR_ON" and in the non-DPR state is defined as "DPR_OFF." When a body is in the proximity of the device, the P-Sensor may be triggered to an ON state (i.e., P_Sens_ON State). When the body is not detected, the P-Sensor may be in an OFF state (i.e., P_Sens_OFF State).

Figure 2:
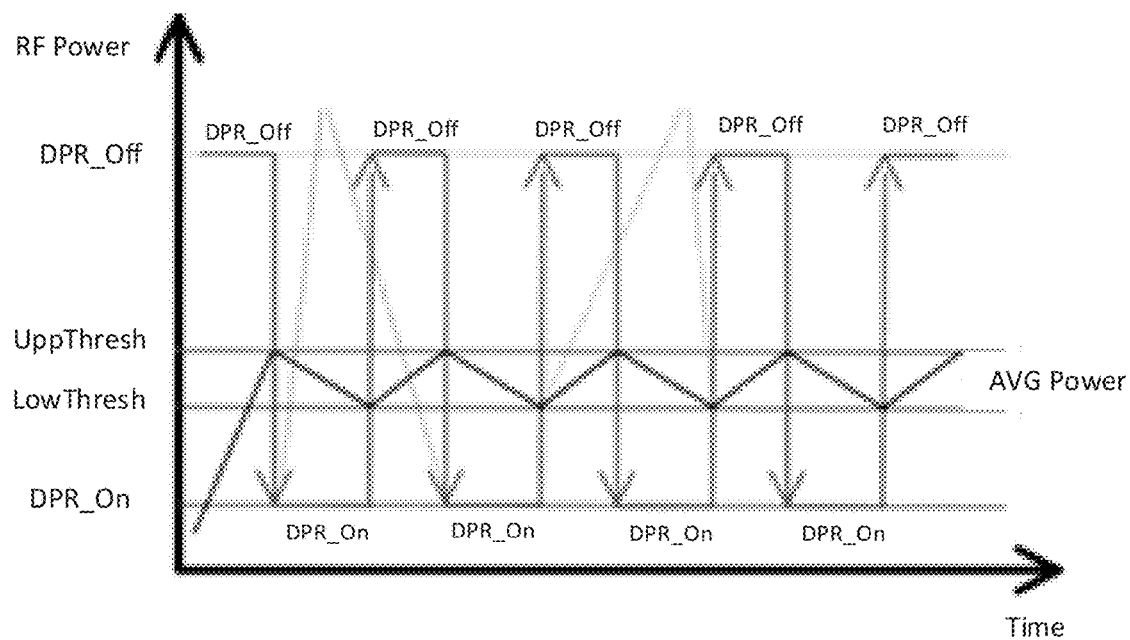
FIGS. 2-3 exemplarily show graphs illustrating RF power vs. time according to some aspects.

FIG. 2 is an exemplary graph illustrating the RF power versus time for a TAS algorithm operation in standalone mode according to some aspects.

At each Tr, the Avg_Pow is calculated for the time-window duration Ta and compared to the UppThresh and the LowThresh of the active mode to determine if Dynamic Power Reduction (DPR) should be turned ON or OFF to maintain SAR compliance. When the Avg_Pow is at or exceeds the UppThresh, DPR is turned ON to limit transmitter maximum output power to a reduced level defined by DPR_ON. In other words, when the Avg_Pow is at or exceeds the UppThresh, a power back-off is applied. When the Avg_Pow is at or below the LowThresh, DPR is turned OFF, i.e., DPR_OFF, thus allowing the maximum output power of the transmitter. In other words, when the Avg_Pow is at or beneath the LowThresh, the power back-off is removed or not applied.

When DPR is ON, the Avg_Pow is maintained between the UppThresh and LowThresh by TAS until DPR is turned OFF. The maximum output power is then restored to DPR_OFF. At each power adjustment interval (Tr), SAR compliance is determined in real-time according to the Avg_Pow. Conservativeness of the algorithm can be ensured through proper selection of the UppThresh and LowThresh and DPR_ON to satisfy the power adjustment and SAR compliance requirements established by Ta.

Figure 3:
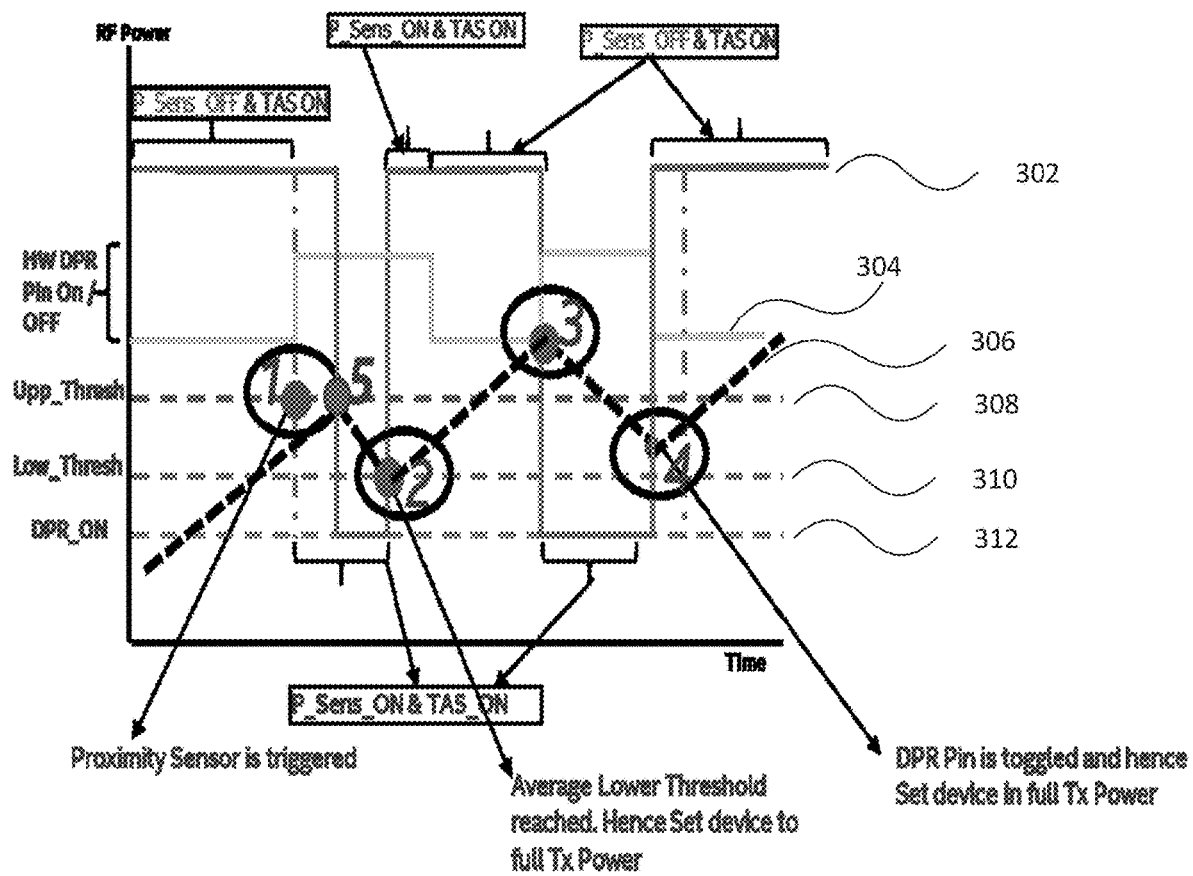

FIG. 3 is an exemplary graph illustrating the RF power versus time for a TAS algorithm combined with P-sensor operation according to some aspects. The TAS algorithm showed in FIG. 2 may be operational all the time. However, according to some aspects, the operations shown in FIG. 2 may be supplemented with the P-Sensor state as shown in FIG. 3.

In FIG. 3, the line marked by 302 indicates the RF transmitter power, where HIGH values indicate maximum RF power and the LOW values indicate DPR is ON, i.e., a power back-off is applied. The line marked by 304 indicates the P-sensor state, where HIGH values indicate the detection of a body and LOW values indicate that no body has been detected. The dashed line marked by 306 is the Avg_Pow. The upper threshold (Upp_Thresh) and the lower threshold (Low_Thresh) are shown by dashed lines 308 and 310, respectively. Dashed line 312 indicates the RF power level when DPR is ON, i.e., when the power back-off is applied.

When a body is detected by a proximity sensor (P-sensor), the P-sensor state goes from P_Sens_OFF to P_Sens_ON. If the Avg_Pow≤Upp_Thresh, the instantaneous power is maintained at DPR_OFF state until the Avg_Pow reaches Upp_Thresh. This is shown in point 1 in FIG. 3. If Avg_Pow>Upp_Thresh, DPR is triggered, and the instantaneous power goes directly to DPR_ON state. This is shown in point 3 of FIG. 3.

When the body is no longer detected, the P-sensor state transitions from P_Sens_ON to P_Sens_OFF. Even if the Avg_Pow>Low_Thresh, the DPR is turned OFF and the instantaneous power goes directly to DPR_OFF state. This is shown as point 4 of FIG. 3.

Figure 4:
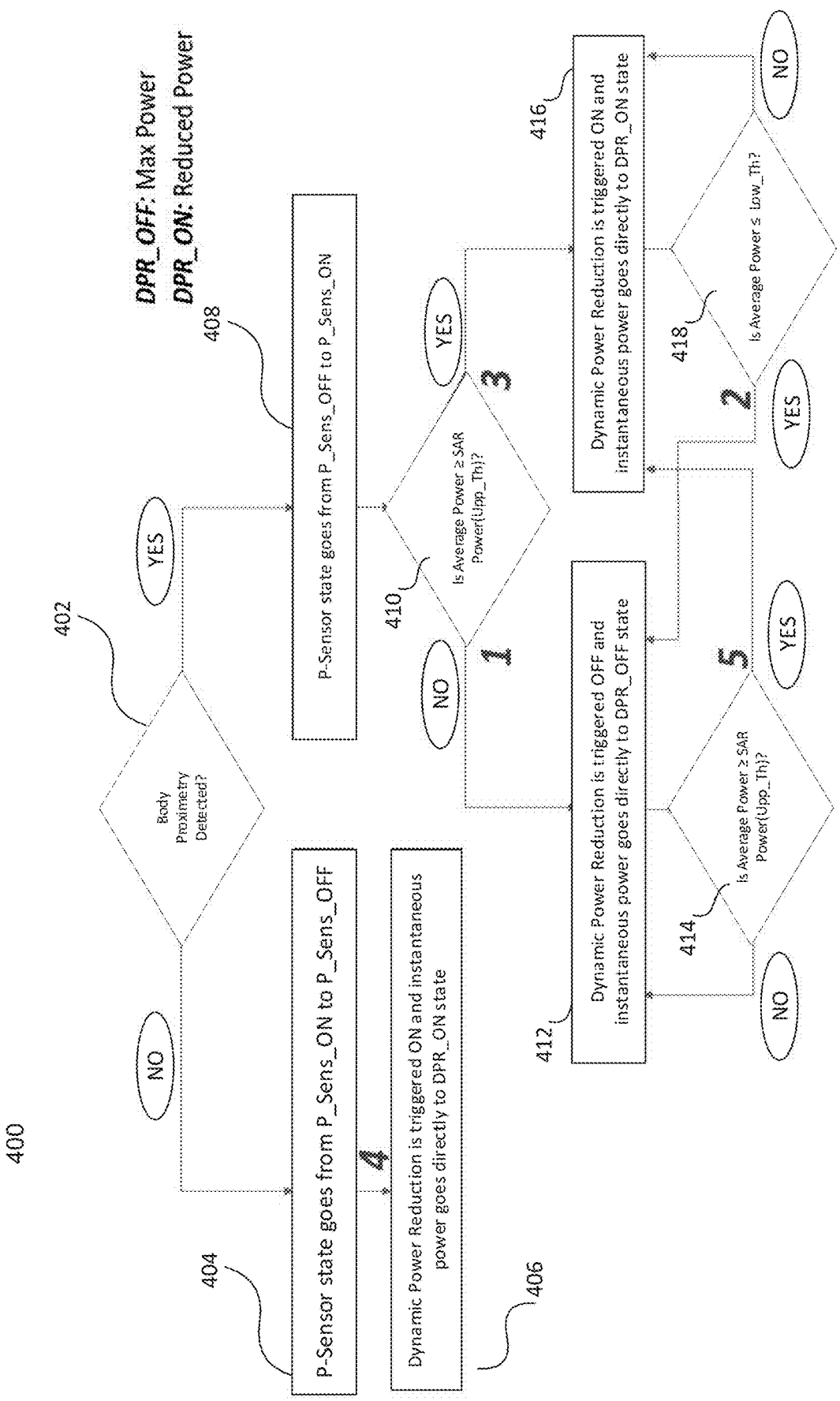
FIG. 4 exemplarily shows a process flowchart according to some aspects.

FIG. 4 is an exemplary flowchart 400 showing a method according to some aspects. The points (i.e., points 1-5) shown in flowchart 400 correspond to the points shown in FIG. 3 and are provided for purposes of facilitating the explanation.

The method may include first determining whether a body is detected 402. If a body is not detected, then the P-Sensor state may go from P_Sens_ON to P_Sens_OFF 404 (or remain in P_Sens_OFF) and dynamic power reduction (DPR) is turned off and the instantaneous power goes to the DPR_OFF state 406, i.e., maximum RF transmit power. This corresponds to point 4 in flowchart 400 may further correspond to point 4 of shown in FIG. 3.

If a body is detected, the P-Sensor state goes from P_Sens_OFF to P_Sens_ON 408 (or remains in P_Sens_ON) and the average power is compared to the upper threshold (Upp_Th) 410.

If the average power is less than the upper threshold (i.e., point 1), then DPR is triggered OFF and the instantaneous power goes to the DPR_OFF state 412. After this, the average power is recomputed at a later Tr and is compared to the upper threshold (Upp_Th) 414. If the average power is still lower, then DPR is maintained OFF with the instantaneous power in the DPR_OFF state, i.e., loop back to 412. If the average power is now higher than the upper threshold, then DPR is triggered ON and the instantaneous power goes to the DPR_ON state 416, i.e., point 5.

Referring back to 410, if the average power is greater than or equal to the upper threshold, then DPR is triggered ON and the instantaneous power goes to the DPR_ON state 416, shown by point 3. After this, the average power is recomputed at a later Tr and is compared to the lower threshold (LowTh) 418. If the average power is less than or equal to the lower threshold, DPR is triggered OFF and the instantaneous power goes to the DPR_OFF state 412, i.e., shown by point 2. If the average power is greater than the lower threshold, then the method loops back to 416.

Figure 5:
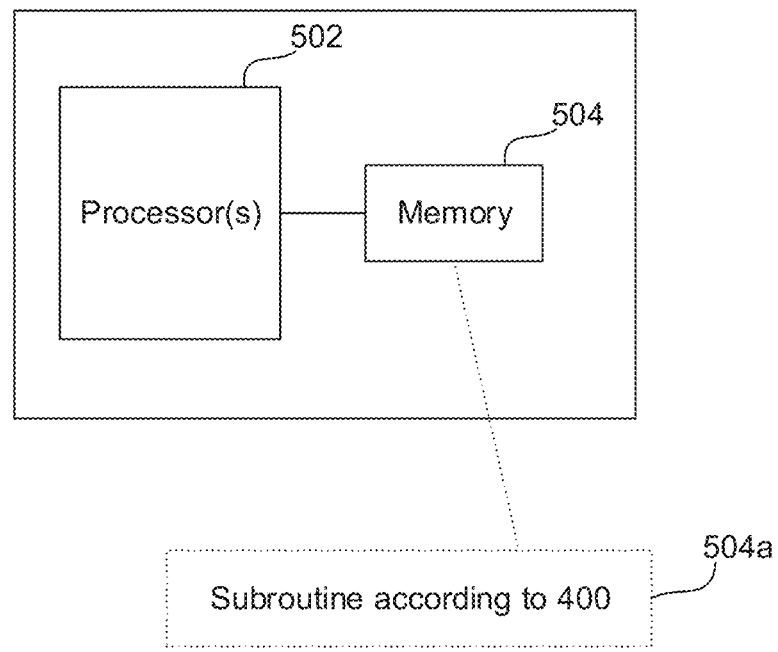
FIG. 5 exemplarily shows an internal configuration of a device with executable instructions according to some aspects.

FIG. 5 shows an internal configuration of a device according to some aspects. As shown in FIG. 5, the device may include processor(s) 502 and memory 504. Processor(s) 502 may be a single processor or multiple processors and may be configured to retrieve and execute program code to perform the methods described herein. For example, processor(s) 502 may be included in a baseband modem and/or an application processor of the terminal device and may transmit and receive data over a software-level connection.

Memory 504 may be a non-transitory computer readable medium storing sub-routine instructions 504a to implement the methods described in this disclosure, e.g., the method shown in 400 of FIG. 4. Memory 504 may be a single memory or may be multiple memories and may be included as internal memories to processor(s) 502 or may be external to processor(s) 502. Memory 504 may be a non-transitory computer readable medium storing instructions for implementing one or more of the methods described herein.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

Further aspects of the disclosure will now be described via example:

In Example 1, a communication device comprising a processor configured to detect whether a body is proximately located based on obtained proximity sensor data; define an upper threshold for a radio frequency (RF) transmit power and a lower threshold for the RF transmit power; calculate an average power of an RF transmitter over a fixed time period; and determine whether to apply or remove a power back-off to the RF transmitter based on whether the body is detected, the average power, and a comparison of the average power to the upper threshold or the lower threshold.

In Example 2, the communication device of Example 1, wherein the upper threshold is based on compliance with specific absorption rate (SAR) regulations and the lower threshold is less than the upper threshold and is determined based on radio access technology conditions that the communication device is operating in.

In Example 3, the communication device of any one of Examples 1 or 2, wherein the fixed time period is an averaging time period defined by SAR regulations.

In Example 4, the device of any one of Examples 1 to 3, the processor configured to, based on the detection of the body, compare the average power to the upper threshold, and if the average power is less than the upper threshold, determine not to apply the power back-off, or if the average power is greater than or equal to the upper threshold, determine to apply the power-backoff.

In Example 5, the communication device of Example 4, the processor configured to, after determining not to apply the power back-off, compare an updated calculation of the average power for a later time instance to the upper threshold, and if the average power being less than the upper threshold, continue to not apply the power back-off, or if the average power being greater than or equal to the upper threshold, determine to apply the power back-off.

In Example 6, the communication device of Example 4, the processor configured to, after determining to apply the power back-off, compare an updated calculation of the average power for a later time instance to the lower threshold, and based on the average power being less than or equal to the lower threshold, remove the power back-off, or based on the average power being greater than the lower threshold, continue to apply the power back-off.

In Example 7, the communication device of any one of Examples 1 to 6, wherein when a body is not detected, the processor is configured to not apply the power back-off.

In Example 8, a method comprising: detecting whether a body is proximately located based on obtained proximity sensor data; defining an upper threshold for a radio frequency (RF) transmit power and a lower threshold for the RF transmit power; calculating an average power of an RF transmitter over a fixed time period; and determining whether to apply or remove a power back-off to the RF transmitter based on whether the body is detected, the average power, and a comparison of the average power to the upper threshold or the lower threshold.

In Example 9, the method of Example 8, wherein the upper threshold is based on compliance with specific absorption rate (SAR) regulations and the lower threshold is less than the upper threshold and is determined based on radio access technology conditions for a radio access technology corresponding to a transmission of the RF transmitter.

In Example 10, the method of any one of Examples 8 or 9, wherein the fixed time period is an averaging time period defined by SAR regulations.

In Example 11, the method of any one of Examples 8 to 10, further comprising comparing the average power to the upper threshold based on the detection of the body, and if the average power is less than the upper threshold, determining not to apply the power back-off, or if the average power is greater than or equal to the upper threshold, determining to apply the power-backoff.

In Example 12, the method of Example 11, further comprising, after determining not to apply the power back-off, comparing an updated calculation of the average power for a later time instance to the upper threshold, and if the average power being less than the upper threshold, continuing to not apply the power back-off, or if the average power being greater than or equal to the upper threshold, determining to apply the power back-off.

In Example 13, the method of Example 11, further comprising, after determining to apply the power back-off, comparing an updated calculation of the average power for a later time instance to the lower threshold, and based on the average power being less than or equal to the lower threshold, removing the power back-off, or based on the average power being greater than the lower threshold, continuing to apply the power back-off.

In Example 14, the method of any one of Examples 8 to 13, further comprising not applying the power back-off when a body is not detected.

In Example 15, a non-transitory computer readable medium comprising instructions, which when executed by a processor of a device, cause the device to: detect whether a body is proximately located based on obtained proximity sensor data; define an upper threshold for a radio frequency (RF) transmit power and a lower threshold for the RF transmit power; calculate an average power of an RF transmitter over a fixed time period; and determine whether to apply or remove a power back-off to the RF transmitter based on whether the body is detected, the average power, and a comparison of the average power to the upper threshold or the lower threshold.

In Example 16, the non-transitory computer readable medium of Example 15, wherein the upper threshold is based on compliance with specific absorption rate (SAR) regulations and the lower threshold is less than the upper threshold and is determined based on radio access technology conditions for a radio access technology corresponding to a transmission of the RF transmitter.

In Example 17, the non-transitory computer readable medium of Example 15 or 16, wherein the fixed time period is an averaging time period defined by SAR regulations.

In Example 18, the non-transitory computer readable medium of any one of Examples 15 to 17, wherein the instructions, when executed by the processor, are further configured to cause the device to compare the average power to the upper threshold based on the detection of the body, and if the average power is less than the upper threshold, determine not to apply the power back-off, or if the average power is greater than or equal to the upper threshold, determine to apply the power-backoff.

In Example 19, the non-transitory computer readable medium of any one of Examples 15 to 18, wherein the instructions, when executed by the processor, are further configured to, after determining not to apply the power back-off, compare an updated calculation of the average power for a later time instance to the upper threshold, and if the average power being less than the upper threshold, continue to not apply the power back-off, or if the average power being greater than or equal to the upper threshold, determine to apply the power back-off.

In Example 20, the non-transitory computer readable medium of Example 19, wherein the instructions, when executed by the processor, are further configured to, after determining to apply the power back-off, compare an updated calculation of the average power for a later time instance to the lower threshold, and based on the average power being less than or equal to the lower threshold, remove the power back-off, or based on the average power being greater than the lower threshold, continue to apply the power back-off.

In Example 21, the non-transitory computer readable medium of any one of Examples 15 to 20, wherein the instructions, when executed by the processor, are further configured to not apply the power back-off when a body is not detected.

In Example 22, a communication device comprising: a proximity detector for detecting whether a body is proximately located based on obtained proximity sensor data; a transmit power threshold definer for defining an upper threshold for a radio frequency (RF) transmit power and a lower threshold for the RF transmit power; a power averager for calculating an average power of an RF transmitter over a fixed time period; and a power back-off implementer for determining whether to apply or remove a power back-off to the RF transmitter based on whether the body is detected, the average power, and a comparison of the average power to the upper threshold or the lower threshold.

In Example 23, the communication device of Example 22, wherein the upper threshold is based on compliance with specific absorption rate (SAR) regulations and the lower threshold is less than the upper threshold and is determined based on radio access technology conditions that the communication device is operating in.

In Example 24, the communication device of any one of Examples 22 or 23, wherein the fixed time period is an averaging time period defined by SAR regulations.

In Example 25, the communication device of any one of Examples 22 to 24, wherein the power back-off implementer is further for, based on the detection of the body, comparing the average power to the upper threshold, and if the average power is less than the upper threshold, determining not to apply the power back-off, or if the average power is greater than or equal to the upper threshold, determining to apply the power-backoff.

In Example 26, the communication device of Example 25, wherein the power back-off implementer is further for, after determining not to apply the power back-off, comparing an updated calculation of the average power for a later time instance to the upper threshold, and if the average power being less than the upper threshold, continuing to not apply the power back-off, or if the average power being greater than or equal to the upper threshold, determining to apply the power back-off.

In Example 27, the communication device of Example 25, wherein the power back-off implementer is further for, after determining to apply the power back-off, comparing an updated calculation of the average power for a later time instance to the lower threshold, and based on the average power being less than or equal to the lower threshold, removing the power back-off, or based on the average power being greater than the lower threshold, continuing to apply the power back-off.

In Example 28, the communication device of any one of Examples 22 to 27, wherein the power back-off implementer is further for, wherein when a body is not detected, not applying the power back-off.

In Example 29, a communication device comprising a a radiofrequency transmitter; a proximity sensor, configured to detect a human body within a proximity of the communication device; and a processor, the processor configured to: calculate an average power of the radiofrequency transmitter over a predetermined duration; and if the calculated average power exceeds a predetermined upper power threshold and the proximity sensor detects a human body within the proximity of the communication device, control the radiofrequency transmitter to operate according to a first operational mode; and if the calculated average power is less than a predetermined lower power threshold that is less than the predetermined upper threshold, or if the proximity sensor detects no human body within the proximity of the communication device, control the radiofrequency transmitter to operate according to a second operational mode.

In Example 30, the communication device of Example 29, wherein the first operational mode comprises controlling the radiofrequency transmitter to reduce its maximum transmit power to a value less than the lower power threshold.

In Example 31, the communication device of Example 29 or 30, wherein the second operational mode comprises controlling the radiofrequency transmitter to increase its maximum transmit power to a value greater than the upper power threshold.

In Example 32, the communication device of any one of Examples 29 to 31, wherein the predetermined duration is 100 seconds.

In Example 33, the communication device of any one of Examples 29 to 32, wherein the processor calculating the average power of the radiofrequency transmitter comprises the processor calculating a first average power between a first instance and the first instance minus the predetermined duration, and calculating a second average power between a second instance, different from the first instance, and the second instance minus the predetermined duration.

In Example 34, the communication device of Example 33, wherein if the second average power exceeds the predetermined upper power threshold and the proximity sensor detects a human body within the proximity of the communication device, the processor is further configured to control the radiofrequency transmitter to operate according to the first operational mode; and if the second average power is less than the predetermined lower power threshold that is less than the predetermined upper threshold, or if the proximity sensor detects no human body within the proximity of the communication device, the processor is further configured to control the radiofrequency transmitter to operate according to the second operational mode.

In Example 35, the communication device of any one of Examples 29 to 34, wherein the processor is configured to calculate multiple average powers of the radiofrequency transmitter using the duration as a sliding time window.

In Example 36, a method comprising: detecting a human body within a proximity of a communication device; calculating an average power of a radiofrequency transmitter of the communication device over a predetermined duration; and if the calculated average power exceeds a predetermined upper power threshold and the human body within the proximity of the communication device is detected, controlling the radiofrequency transmitter to operate according to a first operational mode; and if the calculated average power is less than a predetermined lower power threshold that is less than the predetermined upper threshold, or if no human body is detected within the proximity of the communication device, controlling the radiofrequency transmitter to operate according to a second operational mode.

In Example 37, the method of Example 36, wherein the first operational mode comprises controlling the radiofrequency transmitter to reduce its maximum transmit power to a value less than the lower power threshold.

In Example 38, the method of Example 36 or 37, wherein the second operational mode comprises controlling the radiofrequency transmitter to increase its maximum transmit power to a value greater than the upper power threshold.

In Example 39, the method of any one of Examples 36 to 38, wherein the predetermined duration is 100 seconds.

In Example 40, the method of any one of Examples 36 to 39, wherein calculating the average power of the radiofrequency transmitter comprises calculating a first average power between a first instance and the first instance minus the predetermined duration, and calculating a second average power between a second instance, different from the first instance, and the second instance minus the predetermined duration.

In Example 41, the method of Example 40, wherein if the second average power exceeds the predetermined upper power threshold and a human body is detected within the proximity of the communication device, the method further comprises controlling the radiofrequency transmitter to operate according to the first operational mode; and if the second average power is less than the predetermined lower power threshold that is less than the predetermined upper threshold, or if no human body is detected within the proximity of the communication device, the method further comprises controlling the radiofrequency transmitter to operate according to the second operational mode.

In Example 42, the method of any one of Examples 36 to 41, further comprising calculating multiple average powers of the radiofrequency transmitter using the duration as a sliding time window.

In Example 43, a non-transitory computer readable medium, comprising instructions which, if executed, cause one or more processors to: detect a human body within a proximity of a communication device; calculate an average power of a radiofrequency transmitter of the communication device over a predetermined duration; and if the calculated average power exceeds a predetermined upper power threshold and the human body within the proximity of the communication device is detected, control the radiofrequency transmitter to operate according to a first operational mode; and if the calculated average power is less than a predetermined lower power threshold that is less than the predetermined upper threshold, or if no human body is detected within the proximity of the communication device, control the radiofrequency transmitter to operate according to a second operational mode.

In Example 44, the non-transitory computer readable medium of Example 43, wherein the first operational mode comprises controlling the radiofrequency transmitter to reduce its maximum transmit power to a value less than the lower power threshold.

In Example 45, the non-transitory computer readable medium of Example 43 or 44, wherein the second operational mode comprises controlling the radiofrequency transmitter to increase its maximum transmit power to a value greater than the upper power threshold.

In Example 46, the non-transitory computer readable medium of any one of Examples 43 to 45, wherein the predetermined duration is 100 seconds.

In Example 47, the non-transitory computer readable medium of any one of Examples 43 to 46, wherein calculating the average power of the radiofrequency transmitter comprises calculating a first average power between a first instance and the first instance minus the predetermined duration, and calculating a second average power between a second instance, different from the first instance, and the second instance minus the predetermined duration.

In Example 48, the non-transitory computer readable medium of Example 47, wherein if the second average power exceeds the predetermined upper power threshold and a human body is detected within the proximity of the communication device, the instruction are further configured to cause the processor to control the radiofrequency transmitter to operate according to the first operational mode; and if the second average power is less than the predetermined lower power threshold that is less than the predetermined upper threshold, or if no human body is detected within the proximity of the communication device, the instructions are further configured to cause the processor to control the radiofrequency transmitter to operate according to the second operational mode.

In Example 49, the non-transitory computer readable medium of any one of Examples 43 to 48, wherein the instructions are further configured to cause the processor to calculate multiple average powers of the radiofrequency transmitter using the duration as a sliding time window.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

The invention claimed is:

1. A communication device comprising a processor configured to:
    detect whether a body is proximately located based on obtained proximity sensor data;
    define an upper threshold for a radio frequency (RF) transmit power and a lower threshold for the RF transmit power;
    calculate an average power of an RF transmitter over a fixed time period; and
    determine whether to apply or remove a power back-off to the RF transmitter based on whether the body is detected, the average power, and a comparison of the average power to the upper threshold or the lower threshold.

2. The communication device of claim 1, wherein the upper threshold is based on compliance with specific absorption rate (SAR) regulations and the lower threshold is less than the upper threshold and is determined based on radio access technology conditions that the communication device is operating in.

3. The communication device of claim 1, wherein the fixed time period is an averaging time period defined by SAR regulations.

4. The communication device of claim 1, the processor configured to, based on the detection of the body, compare the average power to the upper threshold, and
    if the average power is less than the upper threshold, determine not to apply the power back-off, or
    if the average power is greater than or equal to the upper threshold, determine to apply the power-backoff.

5. The communication device of claim 4, the processor configured to, after determining not to apply the power back-off, compare an updated calculation of the average power for a later time instance to the upper threshold, and
    if the average power being less than the upper threshold, continue to not apply the power back-off, or
    if the average power being greater than or equal to the upper threshold, determine to apply the power back-off.

6. The communication device of claim 4, the processor configured to, after determining to apply the power back-off, compare an updated calculation of the average power for a later time instance to the lower threshold, and
    based on the average power being less than or equal to the lower threshold, remove the power back-off, or
    based on the average power being greater than the lower threshold, continue to apply the power back-off.

7. The communication device of claim 1, wherein when a body is not detected, the processor is configured to not apply the power back-off.

8. A communication device comprising a
    a radiofrequency transmitter;
    a proximity sensor, configured to detect a human body within a proximity of the communication device; and a processor, the processor configured to:
calculate an average power of the radiofrequency transmitter over a predetermined duration; and
if the calculated average power exceeds a predetermined upper power threshold and the proximity sensor detects a human body within the proximity of the communication device, control the radiofrequency transmitter to operate according to a first operational mode; and
if the calculated average power is less than a predetermined lower power threshold that is less than the predetermined upper threshold, or if the proximity sensor detects no human body within the proximity of the communication device, control the radiofrequency transmitter to operate according to a second operational mode.

9. The communication device of claim 8, wherein the first operational mode comprises controlling the radiofrequency transmitter to reduce its maximum transmit power to a value less than the lower power threshold.

10. The communication device of claim 8, wherein the second operational mode comprises controlling the radiofrequency transmitter to increase its maximum transmit power to a value greater than the upper power threshold.

11. The communication device of claim 8, wherein the predetermined duration is 100 seconds.

12. The communication device of claim 8, wherein the processor calculating the average power of the radiofrequency transmitter comprises the processor calculating a first average power between a first instance and the first instance minus the predetermined duration, and calculating a second average power between a second instance, different from the first instance, and the second instance minus the predetermined duration.

13. The communication device of claim 12, wherein if the second average power exceeds the predetermined upper power threshold and the proximity sensor detects a human body within the proximity of the communication device, the processor is further configured to control the radiofrequency transmitter to operate according to the first operational mode; and
if the second average power is less than the predetermined lower power threshold that is less than the predetermined upper threshold, or if the proximity sensor detects no human body within the proximity of the communication device, the processor is further configured to control the radiofrequency transmitter to operate according to the second operational mode.

14. The communication device of claim 8, wherein the processor is configured to calculate multiple average powers of the radiofrequency transmitter using the duration as a sliding time window.

15. A non-transitory computer readable medium, comprising instructions which, if executed, cause one or more processors to:
detect a human body within a proximity of a communication device;
calculate an average power of a radiofrequency transmitter of the communication device over a predetermined duration; and
if the calculated average power exceeds a predetermined upper power threshold and the human body within the proximity of the communication device is detected, control the radiofrequency transmitter to operate according to a first operational mode; and
if the calculated average power is less than a predetermined lower power threshold that is less than the predetermined upper threshold, or if no human body is detected within the proximity of the communication device, control the radiofrequency transmitter to operate according to a second operational mode.

16. The non-transitory computer readable medium of claim 15, wherein the first operational mode comprises controlling the radiofrequency transmitter to reduce its maximum transmit power to a value less than the lower power threshold.

17. The non-transitory computer readable medium of claim 15, wherein the second operational mode comprises controlling the radiofrequency transmitter to increase its maximum transmit power to a value greater than the upper power threshold.

18. The non-transitory computer readable medium of claim 15, wherein the predetermined duration is 100 seconds.

19. The non-transitory computer readable medium of claim 15, wherein calculating the average power of the radiofrequency transmitter comprises calculating a first average power between a first instance and the first instance minus the predetermined duration, and calculating a second average power between a second instance, different from the first instance, and the second instance minus the predetermined duration.

20. The non-transitory computer readable medium of claim 19, wherein if the second average power exceeds the predetermined upper power threshold and a human body is detected within the proximity of the communication device, the instruction are further configured to cause the processor to control the radiofrequency transmitter to operate according to the first operational mode; and
if the second average power is less than the predetermined lower power threshold that is less than the predetermined upper threshold, or if no human body is detected within the proximity of the communication device, the instructions are further configured to cause the processor to control the radiofrequency transmitter to operate according to the second operational mode.

21. The non-transitory computer readable medium of claim 15, wherein the instructions are further configured to cause the processor to calculate multiple average powers of the radiofrequency transmitter using the duration as a sliding time window.

* * * * *